Figure 1:
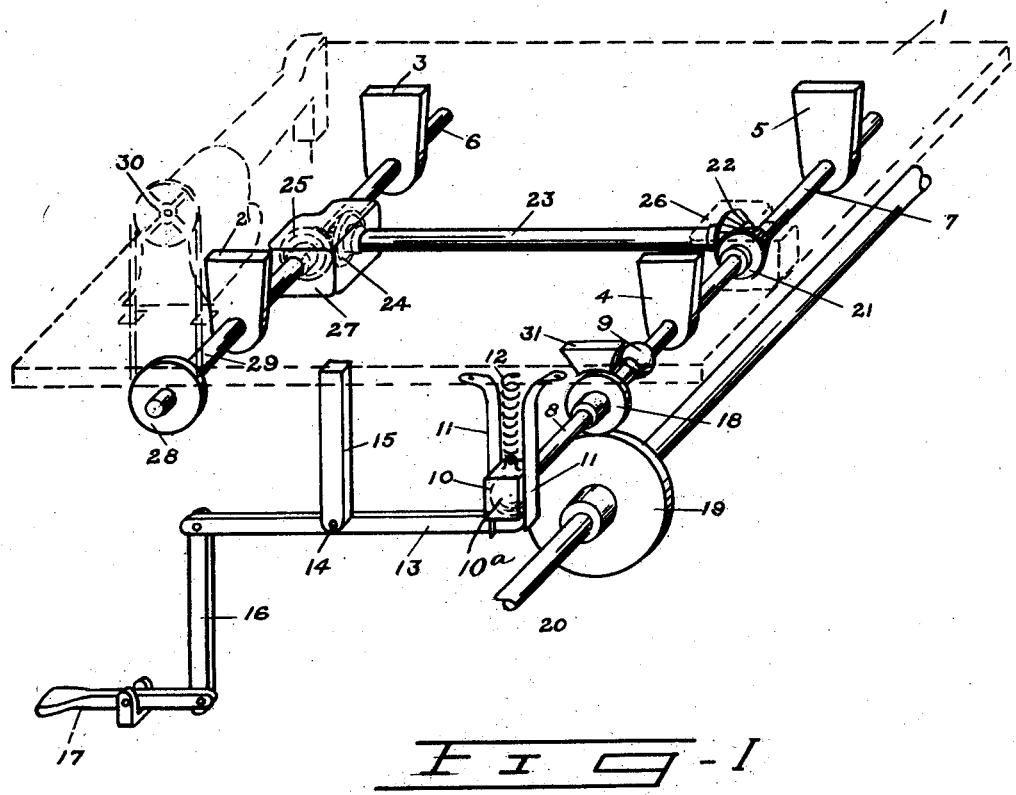

F. J. THIBAULT.
POWER TRANSMISSION FOR SEWING MACHINES.
APPLICATION FILED FEB. 11, 1920.

1,369,364.

Patented Feb. 22, 1921.

INVENTOR
Frank J. Thibault
BY
ATTORNEY

UNITED STATES PATENT OFFICE.

FRANK J. THIBAULT, OF ROCHESTER, NEW YORK.

POWER TRANSMISSION FOR SEWING-MACHINES.

1,369,364. Specification of Letters Patent. Patented Feb. 22, 1921.

Application filed February 11, 1920. Serial No. 357,981.

*To all whom it may concern:*

Be it known that I, FRANK J. THIBAULT, a citizen of the United States, residing at Rochester, in the county of Monroe and State of New York, have invented certain new and useful Improvements in Power Transmission for Sewing - Machines, of which the following is a specification.

The object of this invention is to provide a new and improved form of power transmission, which is especially adapted for use in connection with sewing machines, but can also be used for driving other machinery that is to be driven intermittently at the will of the operator.

This and other objects of the invention will be fully illustrated in the drawings, described in the specification and pointed out in the claims at the end thereof.

In the drawings, the figure is a perspective view of the power transmission mechanism.

In the drawings, like reference numerals indicate like parts.

In the drawings, reference numeral 1 indicates the top of the table on which a sewing machine is adapted to rest and from the under side of which the power transmission mechanism is suspended. Below the table top are provided the brackets 2, 3, 4 and 5. Mounted to rotate in the brackets 2 and 3 is the power shaft 6 and mounted to rotate in the brackets 4 and 5 is the power shaft 7. In line with the power shaft 7 is provided a power shaft 8 connected to the shaft 7 by a universal joint 9 which permits the shaft 8 to swing thereon. The free end of the shaft 8 is carried in the box 10, which can rise and fall in guides 11 which are provided on the under side of the table. In order to allow the box 10 to move freely between the guides 11, the end of the shaft 8 carries a ball 10^A. This ball is mounted to rotate and at the same time swivel in the box 10 so that the shaft 8 cannot bind in the bearing when the box 10 is raised or lowered between the guides in order to move the shaft so as to bring the friction wheel 18 in contact or out of contact with the wheel 19. This ball 10^A is shown in dotted lines in the box 10. A spring 12 is provided by which the box 10 is normally held up from the bottom of the guides. When the box 10 is at the bottom of the guides, the shaft 8 will be in line with the shaft 7.

The box 10 is drawn down against the bottom of the guides by means of the lever 13 pivoted at 14 to the bracket 15, the outer end of which lever is connected by a link 16 to the treadle 17. When the outer end of the treadle is pushed down by the foot of the operator, the box is drawn down to the bottom of the guides.

On the shaft 8 is provided a friction wheel 18 that engages with the friction wheel 19 carried on the main power shaft 20 by which the shafts 8 and 7 are driven.

On the shaft 7 is provided a bevel gear 21 which meshes with the bevel gear 22 on one end of the jack shaft 23. On the other end of the jack shaft is provided the bevel gear 24 which meshes with the bevel gear 25 on the shaft 6. The bevel gears 21 and 22 are inclosed in a housing 26 and the bevel gears 24 and 25 are inclosed in a housing 27.

On the end of the shaft 6 is provided a pulley 28 which drives a belt 29 which in turn drives a pulley 30 carried on the shaft of the sewing machine or any other machine that is to be driven.

When the operator wishes to drive the machine, he presses down on the treadle 17 and this in turn draws down the box 10 until the friction wheel 18 makes contact with the wheel 19 and holds the wheel 18 in that position, whereupon it will be driven by the friction wheel 19 and through the transmission mechanism above described the sewing machine will be driven thereby. When the operator releases the treadle 17, the spring 12 draws up on the box 10 and takes the friction wheel 18 out of contact with the friction wheel 19 so that it is no longer driven thereby. When the friction wheel 18 lifts a small fraction of an inch, it comes into contact on its upper side with a friction brake 31 carried on the table by which it and the mechanism driven thereby are quickly brought to rest.

I claim:

1. In a power transmission, the combination of a main power shaft having a friction wheel thereon, a second shaft parallel thereto, a universal joint on said second shaft, an intermediate shaft swinging on said universal joint, said intermediate shaft having a friction wheel thereon that moves into and out of contact with the friction wheel on the main power shaft on the swinging of the intermediate shaft, a pair of guides for directing the movement of the intermediate shaft, a box mounted to slide between said guides, a ball carried on the end of said shaft and mounted to rotate and swivel in said box.

2. In a power transmission, the combination of a main power shaft having a friction wheel thereon, a second shaft parallel thereto, a universal joint on said second shaft, an intermediate shaft swinging on said universal joint, said intermediate shaft having a friction wheel thereon that moves into and out of contact with the friction wheel on the main power shaft on the swinging of the intermediate shaft, a pair of guides for directing the movement of the intermediate shaft, a box mounted to slide between said guides, a ball carried on the end of said shaft and mounted to rotate and swivel in said box, a spring connected to said box operating to normally draw said shaft and its friction wheel away from the friction wheel on the main shaft.

3. In a power transmission, the combination of a main power shaft having a friction wheel thereon, a second shaft parallel thereto, a universal joint on said second shaft, an intermediate shaft swinging on said universal joint, said intermediate shaft having a friction wheel thereon that moves into and out of contact with the friction wheel on the main power shaft on the swinging of the intermediate shaft, a pair of guides for directing the movement of the intermediate shaft, a box mounted to slide between said guides, a ball carried on the end of said shaft and mounted to rotate and swivel in said box, a spring connected to said box operating to normally draw said shaft and its friction wheel away from the friction wheel on the main shaft, a treadle and connections for drawing the intermediate shaft down to bring its friction wheel into contact with the friction wheel on the main shaft.

4. In a power transmission, the combination of a main power shaft having a friction wheel thereon, a second shaft parallel thereto, a universal joint on said second shaft, an intermediate shaft swinging on said universal joint, said intermediate shaft having a friction wheel thereon that moves into and out of contact with the friction wheel on the main power shaft on the swinging of the intermediate shaft, a pair of guides for directing the movement of the intermediate shaft, a box on said shaft, moving in said guides, a spring connected to said box operating to normally draw said shaft and its friction wheel away from the friction wheel on the main shaft, a treadle and connections for drawing the intermediate shaft down to bring its friction wheel into contact with the friction wheel on the main shaft, a third shaft parallel to the second shaft, a jack shaft at right angles to the shafts and connected to both of them by bevel gearing.

5. In a power transmission, the combination of a main power shaft having a friction wheel thereon, a second shaft parallel thereto, a universal joint on said second shaft, an intermediate shaft swinging on said universal joint, said intermediate shaft having a friction wheel thereon that moves into and out of contact with the friction wheel on the main power shaft on the swinging of the intermediate shaft, a pair of guides for directing the movement of the intermediate shaft, a box on said shaft, moving in said guides, a spring connected to said box operating to normally draw said shaft and its friction wheel away from the friction wheel on the main shaft, a treadle and connections for drawing the intermediate shaft down to bring its friction wheel into contact with the friction wheel on the main shaft, a third shaft parallel to the second shaft, a jack shaft at right angles to the shafts and connected to both of them by bevel gearing, a housing around the bevel gearing at each end of the jack shaft.

In testimony whereof I affix my signature.

FRANK J. THIBAULT.